United States Patent [19]

Dailey et al.

[11] Patent Number: 5,760,371
[45] Date of Patent: Jun. 2, 1998

[54] WATER-COOLED STATOR COIL HEADER REPAIR PROCESS

[75] Inventors: George F. Dailey, Pittsburgh; Gary W. Swartzbeck, Huntingdon, both of Pa.; Greyson L. Mellon, Oviedo, Fla.; Michael T. O'Leary, Apollo, Pa.

[73] Assignee: Westinghouse Electric Corporation, Pittsburgh, Pa.

[21] Appl. No.: 569,818

[22] Filed: Dec. 8, 1995

[51] Int. Cl.$^6$ .................................................. B23K 1/00
[52] U.S. Cl. .................. 219/129; 219/85.18; 219/85.22; 228/119
[58] Field of Search ........................... 219/129, 137 R, 219/85.1, 85.18, 85.22; 228/119, 180.1; 310/54, 59; 29/596

[56] References Cited

U.S. PATENT DOCUMENTS

| | | | |
|---|---|---|---|
| 3,614,493 | 10/1971 | Collings et al. | 310/54 |
| 4,066,203 | 1/1978 | Davies | 228/180.1 |
| 4,629,917 | 12/1986 | Brem | 310/59 |

OTHER PUBLICATIONS

Taillon, J., et al., In Place Brazing solution To Liquid Cooled Stator Winding Leaks, *Mechanical Dynamics and Analysis, Inc.*, Schnectady, N.Y.

Comprehensive Waterclip Solution, *ABB Power Generation, Inc.*, Richmond, VA.

*Primary Examiner*—Clifford C. Shaw

[57] ABSTRACT

A process is disclosed for repairing leaks in turbine generators that have water cooled stator coils with hollow conductor strands. Such generators have a tendency to leak where the stator coil joins a header. Once a leak is detected the repair is accomplished by following the steps off the invention. First, the header is cut into an outboard section, and into an inboard section that remains attached to the conductor strands. Second, the exposed lead ends of the conductor strands and the attached inboard section are cleaned to remove oxidation. Third, a water-tight braze seal is applied over the lead ends of the conductor strands. And finally, the stator coil and the inboard section are joined to a new outboard section.

20 Claims, 4 Drawing Sheets

WATER-COOLED STATOR COIL HEADER REPAIR PROCESS

FIELD OF THE INVENTION

This invention relates generally to the field of turbine generator repair. More specifically, this invention relates to a process for repairing leaks in liquid cooled stator coils used in turbine generators.

BACKGROUND OF THE INVENTION

Turbine generators used by the electric utility industry generate extremely high temperatures in various generator components. Of particular interest to the present invention, undesirable heat is generated in the stator windings of such generators and must be removed to keep the stator windings from overheating. To provide the necessary cooling to the stators windings in these turbine generators, a variety of techniques have been employed. One technique incorporates hollow individual conductor strands in the stator coil through which a liquid coolant circulates (see e.g., Collins, U.S. Pat. No. 3,614,493, which is hereby incorporated by reference). The coolant collects heat from the conductor strands, carries it away from the stator coil, and releases it.

A stator coil used in such generators is generally comprised of a bundle of individual conductor strands, some of which may have hollow cores, that are collected together to form a single stator coil. At the lead end of the stator coil, where the conductor strands terminate, it is necessary to complete the electrical and coolant flow circuits. For these circuit completion purposes, a conductive header is used that makes the electrical connection while providing a conduit for the coolant to flow through the stator coil. Thus, coolant flows through the header and into the hollow conductor strands of the stator coil where heat is collected. After collecting the heat, the coolant flows out through a header at the other end of the stator coil.

Because the stator coil and the header are separate components, they must be joined together at their interface. Typically, the stator coil is joined to the header with a conductive braze that provides electrical conductivity between the header and stator while providing a fluid-tight seal. In recent years, the electric utility industry has experienced problems with water leakage in turbine generators that use water-cooled stators. Specifically, water leakage around the area of the stator coil to header braze joints has caused generators to fail. The primary cause of the leaks has been traced to the design of the braze joints.

A design particularly susceptible to this water leakage problem is shown in FIG. 1. In this design, the hollow conductor strands 14 and solid conductor strands 12 are bundled together to form a stator coil 20. After the conductor strands are bundled together and bent to the desired form, an epoxy resin binds the conductor strands 12, 14. The entire stator coil 20 assembly is then wrapped with a groundwall insulation 28. At the lead end 26 of the stator coil 20, where the stator coil 20 joins the header 30, the conductor strands 12, 14 are exposed to facilitate the connection. Thus, the conductor strands 12, 14 are not epoxied or wrapped with the groundwall insulation 28 at that point. This lead end 26 of stator coil 20 is extended into the header 30 to interface stator coil 20 to header 30, completing the electrical/hydraulic circuit.

FIG. 3 shows a cross section of the stator coil 20 and header 30 interface taken along the line 3—3 in FIG. 1. As illustrated, only the trailing portion 24 of the lead end 26 is brazed to header 30. The leading portion 22 is not brazed to the header 30, and leaves column and row voids 40 between the conductor strands 12, 14. Additionally, a void 40 exists between the walls of the header and along the non-brazed leading portion 22 of the stator coil 20. Problematically, coolant water tends to permeate back through voids 40 and mix with the flux used in the original brazing process. This water and flux mixture forms an acid which eats through the braze and continues back into the stator coil 20 and the groundwall insulation 28. If left uncorrected, this leakage could cause a failure in the generator.

Thus, there is a need for a method of repairing the stator coil and header interface to stop the leakage and prevent the likelihood that the leak will recur.

SUMMARY OF THE INVENTION

The present invention provides a method for repairing the stator coil and header interface to stop the leak while providing a longer term solution to the underlying original braze design problem. According to the method of the present invention, the interface is repaired by sectioning the leaking header at a point beyond the lead ends of the stator coil. As a result of this sectioning, the lead ends of the conductor strands and the voids between them are accessible. The exposed lead ends are then cleaned to remove oxidation build-up. After the lead ends are cleaned, a new braze seal is applied to both seal the leak and seal the voids between the conductor strands, which provides the primary catalyst for the leaks. Cleaned and sealed, the stator coil and header section is joined to a new header and the repair is complete.

According to an aspect of the present invention, the cleaning process employs several steps in both preparation for and application of an abrasive blast cleaner, which removes the oxidation build-up. First, the openings in the conductor strands are uniformly shaped and sized using a tapered pin. Second, the openings in the conductor strands are plugged with a polyurethane plug. The lead ends and the remaining header section are then ready for the abrasive blast cleaner. To accomplish the abrasive cleaning, a glass bead abrasive is directed at the lead ends and the coating of oxidation.

According to another aspect of the present invention, after preparation, a braze alloy seal is applied with a Gas Tungsten Arc welder. In preparation for the seal, ceramic plugs are inserted into the openings in the hollow conductor strands for the duration of the welding to prevent braze material from entering those conductor strands. Then, a braze alloy rod comprised of copper, silver and phosphorus is melted and applied to the voids between the conductor strands and around the walls of the remaining header section.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF THE PREFERRED EMBODIMENTS

Figure 1:
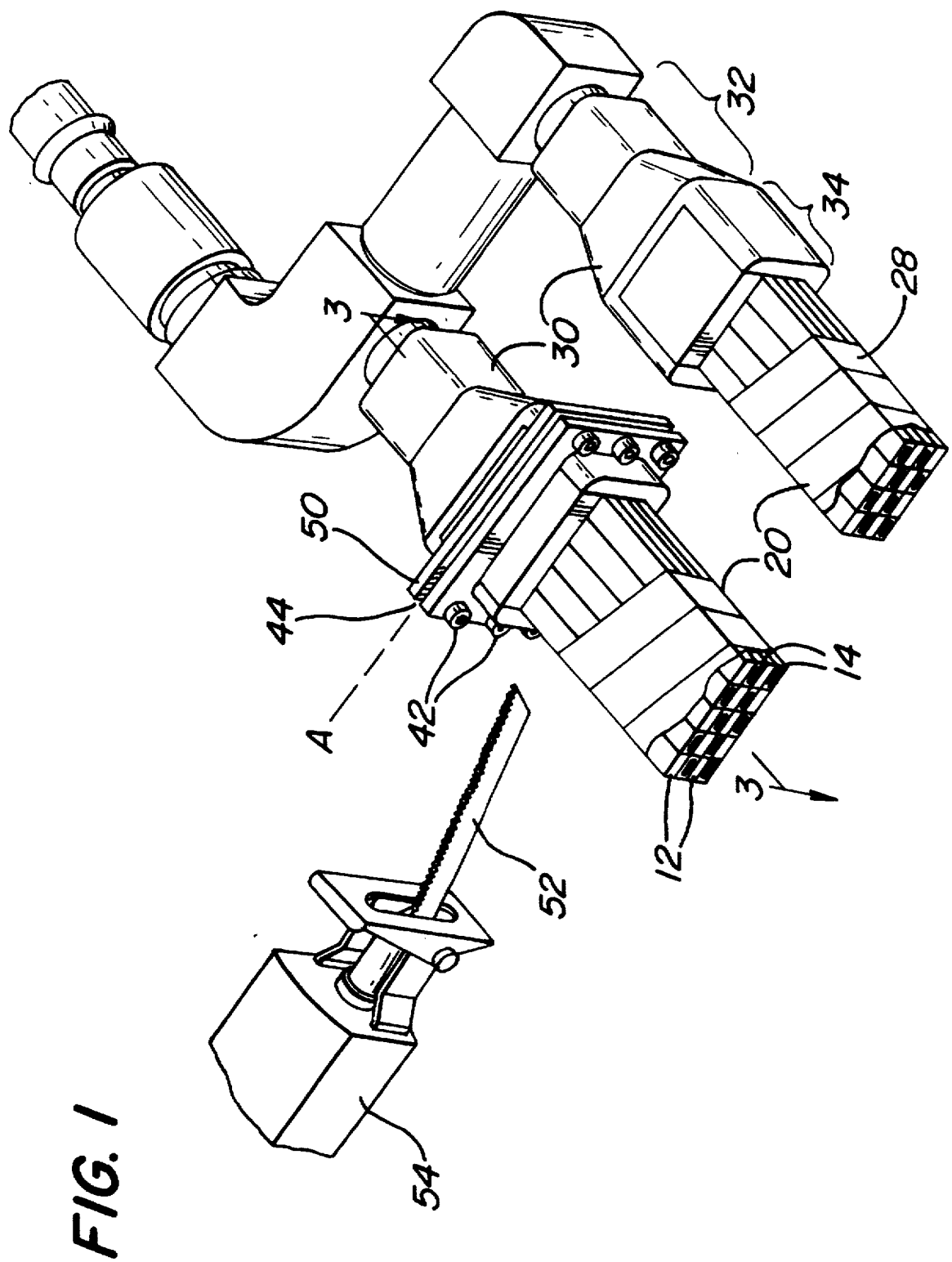
FIG. 1 illustrates a water cooled header connected to stator coils.

Referring to the drawings wherein like numerals indicate like elements throughout, FIG. 1 depicts the header and stator coil sub-assembly. In the normal operating condition, the stator coils 20 are inserted into the openings in the header 30 at the inboard side 34 of the header 30. Water flows through opening 36 to cool the stator coils 20 during operation of the turbine generator (not shown).

Figure 2:
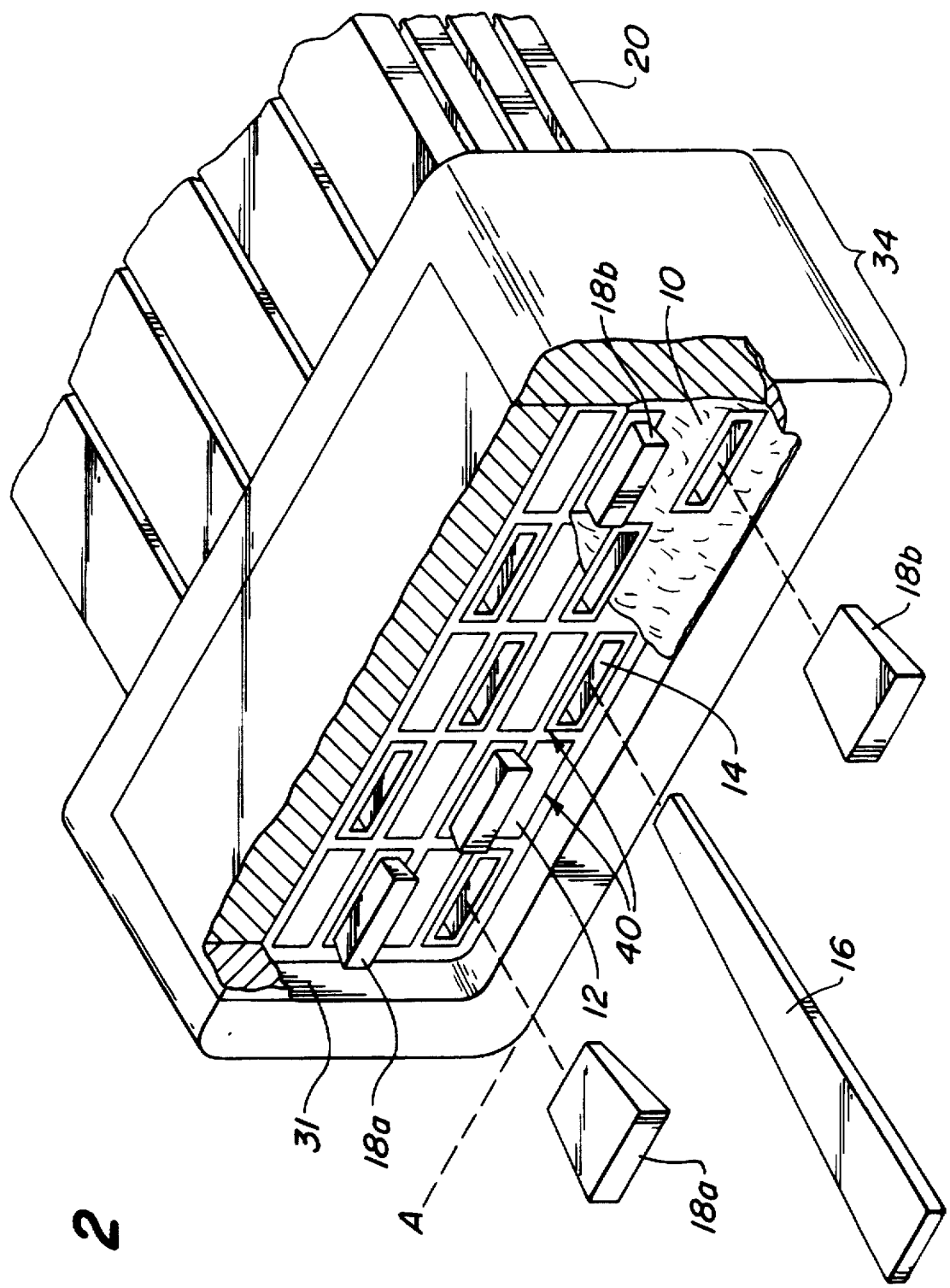
FIG. 2 illustrates a view of the stator coil and a section of the header remaining attached thereto.
Figure 3:
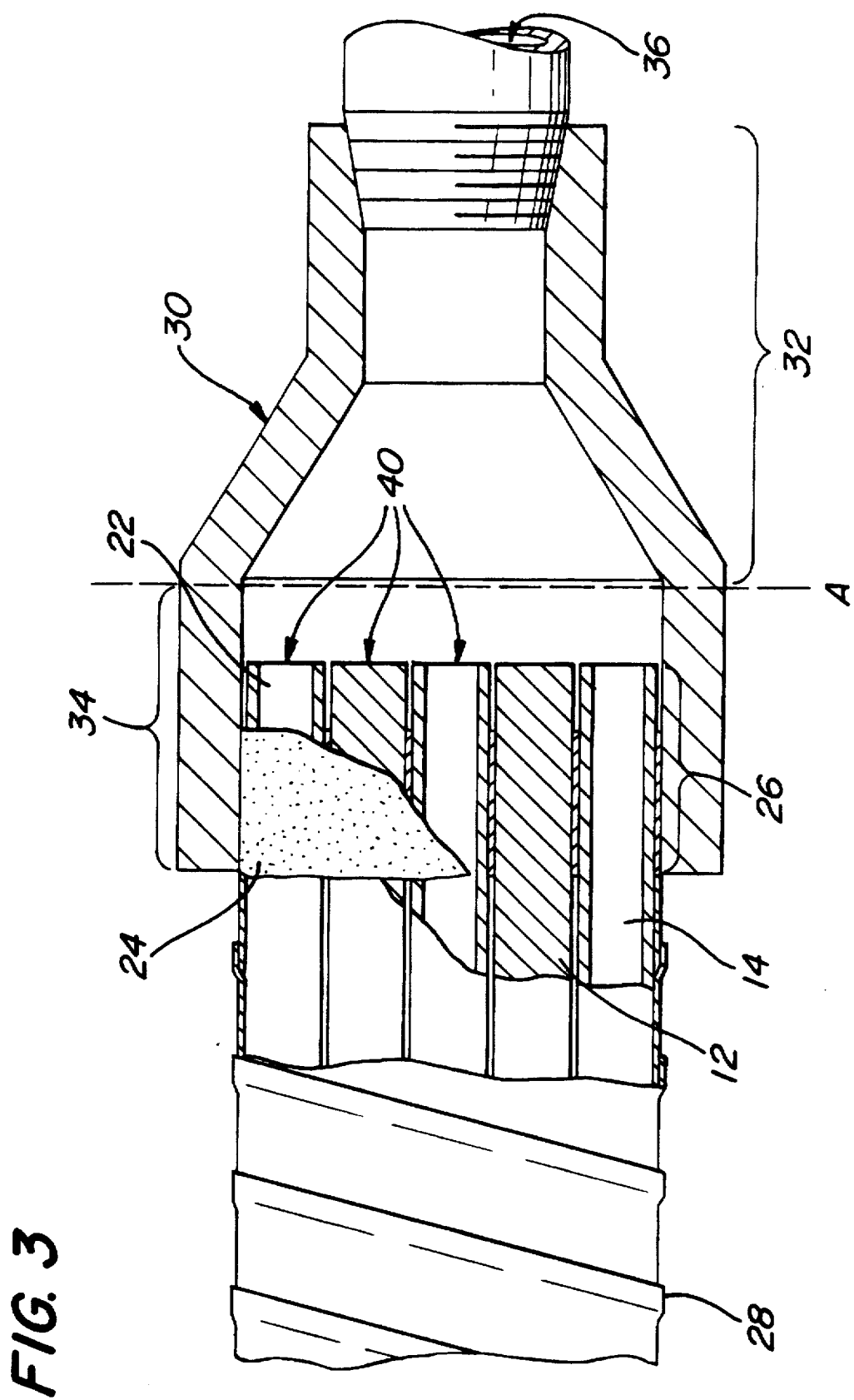
FIG. 3 illustrates a side view of the stator coil lead ends inserted into the header.

FIG. 3 shows a cut-away side view of the stator coil 20 and header 30 interface along line 3—3 in FIG. 1. As illustrated, the lead end 26 of the stator coil 20 is inserted into the header 30. No insulation separates the lead ends 26 from the header 30. Importantly, the lead end 26 is further divided between a non-brazed leading portion 22 and a brazed trailing portion 24 portion. The non-brazed leading portion 22 extends deeper into the header 30 and is characterized by voids 40 between the conductor strands 12, 14. As noted above, these voids 40 provide an opportunity for water to mix with the brazing flux, contributing significantly to the origin of water leakage. The disposition of the voids 40 can also be appreciated from the cross-sectional view provided in FIG. 2. As shown, columns and rows of the voids 40 exist between the conductor strands 12, 14 of the stator coil 20. These voids 40 must be sealed to prevent the development of leak-causing acid.

As will be described in more detail below, the present invention provides a process for detecting and correcting leaks. At an overview level, the process comprises four major steps. First, a leaking header 30 is sectioned to expose the lead ends 26 of the conductor strands 12, 14. Second, the exposed conductor strands are cleaned to remove oxidation. Third, a braze seal 10 is applied over the voids 40 between the conductor strands 12,14. And finally, a new header is joined to the sealed stator coil 20 and the header section that remains attached thereto. All the major steps in this repair process are flow charted in FIG. 4, which can be used as a guide to accompany the more detailed description below.

Figure 4:
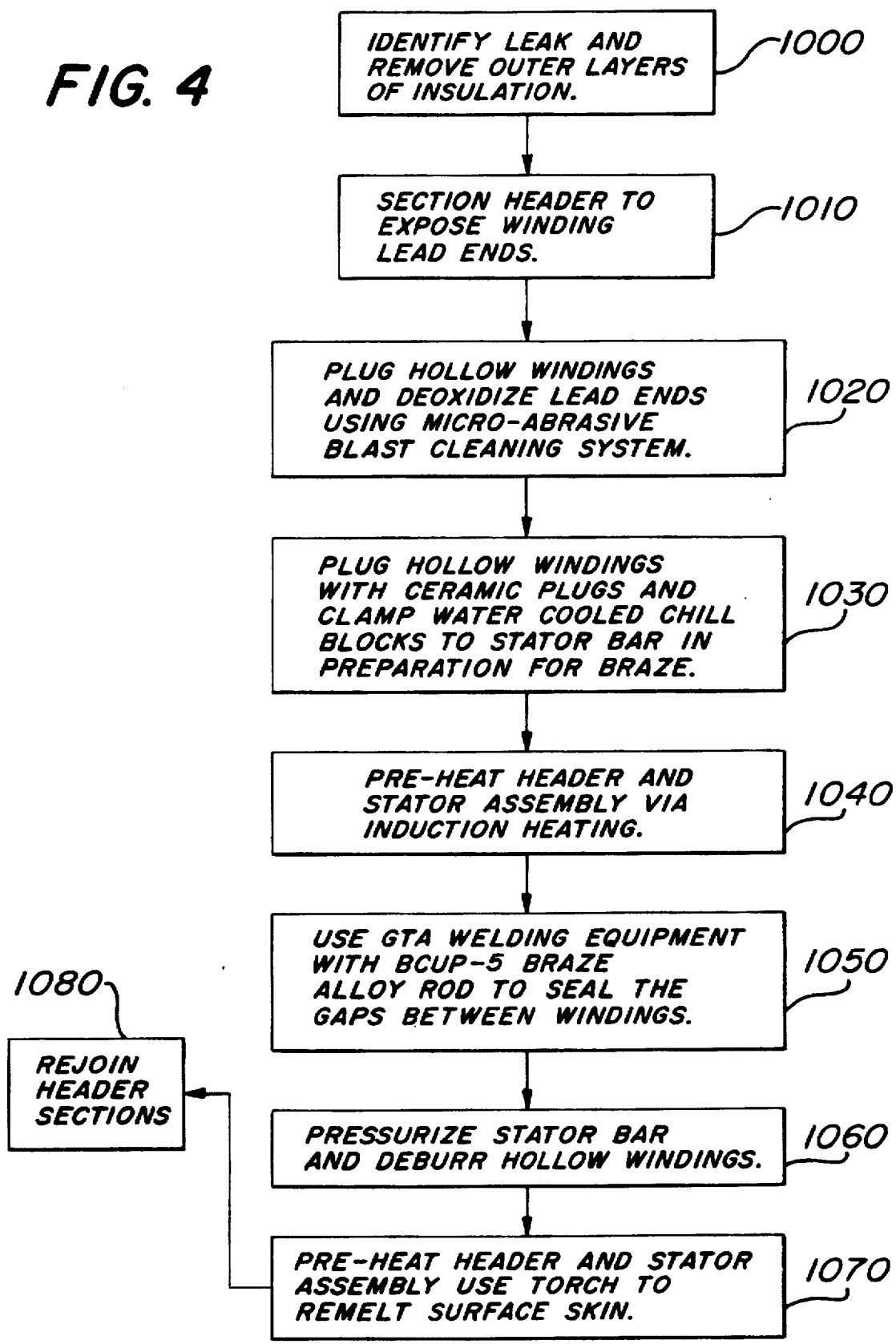
FIG. 4 illustrates the steps in the process for repairing the header and stator assembly.

According to the method of the present invention depicted in FIG. 4, first (step 1000), a leaking stator 20 and header 30 interface is identified. Subsequently, the outer layers of insulation are removed from the area around the leak. To locate the leaks, the water passages in the header 30 and stator conductor strands 14 are drained of water and supplied with helium. A commercially available gas sniffer is then used to ferret-out leaking interfaces. Once the leak is located, groundwall insulation 28 is stripped from around the entire header 30 and from the stator coil 20 to a distance of about three to four inches back from the header 30.

Second (step 1010), the header 30 is sectioned to reveal the lead ends 26 of the conductor strands 12, 14. The objective is to cut through the header 30 at a point A, which is illustrated throughout the various views of the header 30 and stator 20 interface in FIGS. 1–3. In particular, FIG. 2 shows the stator coil 20 and the portion of header 30 that remains attached to the stator coil 20 after the header 30 has been sectioned at point A. The header 30, thus sectioned, comprises an inboard portion 34, which remains connected to the stator coil 20, and an outboard portion 32, which is disconnected from the stator coil 20. Importantly, the lead ends 26 of the stator coil are not themselves cut. Rather, the header is cut slightly away from the point where the lead ends 26 terminate. Cut at this point, the non-brazed leading portion 22 of lead ends 26 are exposed and accessible. Thus, a braze seal 10 can be applied to the voids 40.

As illustrated in FIG. 1, during the repair process, the header 30 and stator 20 interface is placed in an alignment fixture 50, which is mounted directly to the header 30. This alignment fixture 50 has two halves that are bolted together with bolts 42 leaving alignment guide slot 44 for the saw blade 52 to travel through the header 30. Initially, several of the bolts are removed. As the saw moves through the alignment guide slot 44 and cuts through the header 30, the removed bolts are replaced and other bolts are removed. Thus, the alignment fixture 50 ensures that the cut is square while the saw 54 cuts through the header. After the sectioning is completed, the non-brazed leading portion 22 of the stator coil 20 is exposed. The voids 40 between the conductor strands are then accessed though the opening provided by the outboard portion 34 of sectioned header 30. The result of sectioning the header 30 and the accompanying accessibility to the non-brazed leading portion 22 of the stator coil 20 is illustrated in FIG. 2.

As indicated in FIG. 4 (step 1020), the ends of the conductor strands 12, 14 exposed by the sectioning of header 30 must be cleaned to remove oxidation and prepared for application of the braze seal 10. According to the presently preferred method, an abrasive blast system is used to remove the oxidation. Moreover, although any comparable abrasive media is acceptable, a number six glass bead abrasive is presently preferred. During the cleaning process, the openings at the end of each hollow conductor strand 14 must be plugged to prevent contamination of the core of the hollow conductor strands 14 by the cleaning media. Thus, the opening of each hollow conductor strand 14 is first uniformly sized with the tapered expansion pin 16 illustrated in FIG. 2. Used in this way, the expansion pin 16 ensures that the opening of every hollow conductor strand 14 is substantially the same size and shape and will accept plugs 18. The plugs 18a, used during the cleaning process to prevent the abrasive media from entering the hollow conductor strand 14, can be fashioned from any suitable material. According to the presently preferred method, the plug used in the cleaning process is made of a polyurethane material.

As indicated in step 1030, once the surface to be brazed, i.e., the lead end 26 of the stator coil 20 and the inboard header section 34, has been de-oxidized, the surface is ready for the braze seal 10. If the braze material were applied directly to the conductor strand ends 12, 14, the braze material could, potentially, clog a number of the hollow conductor strands 14. To prevent this undesirable effect, the openings in the hollow conductor strands are again plugged before applying the braze seal 10. The polyurethane plugs 18a, used during the cleaning process, are not suitable for this purpose because of the high temperatures experienced during the brazing. Instead, a similarly shaped and sized plug 18b is formed of a high temperature ceramic material, which is inserted in place of the polyurethane plugs. Moreover, to prevent heat damage to the insulation in the stator coil 20, chill blocks are attached to the stator coil 20 to keep the temperature of the stator coil 20 in an acceptable range during the brazing process.

After the stator 20 and attached inboard header section 34 are prepped for the braze seal 10, this assembly is pre-heated (step 1040) to encourage strong bonding of the braze seal. A variety of pre-heating techniques could be used to accomplish this purpose. However, according to the presently preferred method, an induction heater is employed. As an alternate example, torch heating may also work effectively. However, the torch alternative could burn the insulation, which is not desirable. Thus, the induction heating method is preferred. In particular an 80 kilowatt tuned single turn induction coil running at 25 Hz provides the induction pre-heating. Using approximately 6000 Amps in the induction coil, the temperature of the non-brazed lead end 22 reaches the preferred temperature of about 850 degrees fahrenheit.

As indicated at step 1050, the assembly is now ready for a braze seal 10. The braze seal 10 is applied with a commercially available gas tungsten arc welder (GTA) and braze alloy rod. The presently preferred brazing material is primarily comprised of copper with a smaller percentages of silver and phosphorus flux. For example, a commercially available brazing rod such as BCUP-5, which is 80% copper, 15% silver and 5% phosphorus, is an effective, and presently preferred, brazing material selection. However, other BCUP alloy brazing rods that consist of slightly different percentages of the copper, silver and phosphorus would also be effective.

The amperage and voltage settings on the GTA welder are selected such that the conductor strand material under the arc reaches a high brazing temperature without melting. For example, the range of about 1300 to 1350 degrees fahrenheit produces desirable brazing results. After the proper temperature is attained, the GTA torch is moved from strand to strand to form a braze alloy seal 10 between the rows and columns of conductor strands 12, 14 and around the stator coil 20 where it is enveloped by the inboard header section 34. The primary objective of the braze is to provide a water-tight seal over the top of the previously non-brazed lead end 22. When the first application of braze material has been completed, the ceramic plugs 18b are removed. While a water tight seal may be formed with a single layer of braze alloy, to ensure a higher quality seal, an additional layer of braze alloy should be applied. This second layer of braze alloy is applied after the ceramic plugs have been removed.

Significantly, the braze seal 10 is also applied to the exposed interior walls 31 of the inboard portion 34 of header 30. Because the header 30 is made from cast copper, these interior walls 31 are porous and tend to promote corrosion. As such, a coating of braze material will enhance the corrosion resistant characteristics promoted by the repair process.

At step 1060, when the brazing is completed, the openings in the hollow conductor strands 14 are de-burred to remove stray brazing alloy while pressurized air is forced through the stator coil 20 to prevent de-bur chips from entering the water passages. The braze seal 10 is completed at step 1070 when the stator coil 20 and the attached header section are pre-heated again, and the GTA torch is used to remelt the surface skin of the braze seal 10 to form a smooth surface. This step ensures that no irregularities remain in the surface skin that could later encourage corrosion.

A final pressure test is performed to ensure the integrity of the repair. If the test is successful, as indicated at step 1080, the stator coil 20 and the inboard header section 34 are joined to a new outboard header section 32. Original headers, cast from copper, are notoriously porous and conducive to corrosion. Thus, the new outboard header section 32 is machine tooled to provide smooth water passages. The new outboard header section 34 is aligned to the inboard header section 32 with an axial force of 80 pounds while the two sections are brazed together.

The present invention may be embodied in other specific forms without departing from the spirit or essential attributes thereof, and accordingly, reference should be made to the appended claims, rather than to the foregoing specification, as indicating the scope of the invention.

What is claimed is:

1. A process for repairing leaks in water cooled stator coils having a plurality of hollow conductor strands each having a lead end with an opening therein, and wherein the lead ends of the conductor strands are joined to a header, comprising the steps of:
   (a) sectioning the header into an outboard section, and into an inboard section that remains attached to the conductor strands, such that the lead ends of the conductor strands are accessible;
   (b) cleaning the lead ends of the conductor strands and the attached inboard section;
   (c) applying a water-tight braze seal over the lead ends of the conductor strands; and,
   (d) after the braze seal has been applied, joining the stator coil and the inboard section to a second outboard section.

2. The process as recited in claim 1 wherein step (a) comprises the steps of:
   aligning the stator coil and header in an alignment fixture; and,
   cutting through the header with a saw.

3. The process as recited in claim 1 wherein step (b) comprises the steps of:
   (i) plugging each opening in the lead end of the plurality of hollow conductor strands;
   (ii) de-oxidizing the lead ends of the conductor strands and inboard section.

4. The process as recited in claim 3 wherein the step of plugging each opening comprises inserting a tapered plug into each opening in the plurality of hollow conductor strands.

5. The process as recited in claim 4 wherein said plurality of tapered plugs are comprised of polyurethane.

6. The process as recited in claim 4 wherein a tapered expansion pin is inserted into and removed from each opening of the plurality of hollow conductor strands before the tapered plug is inserted.

7. The process as recited in claim 3 wherein the step of de-oxidizing comprises blasting the conductor strand lead ends and inboard section with a micro-abrasive media.

8. The process as recited in claim 7 wherein said micro-abrasive media is a glass bead.

9. The process as recited in claim 1 wherein the step (c) comprises the steps of:
   pre-heating the stator coil and the inboard section with an induction heater; and,
   brazing a braze alloy rod between the conductor strands.

10. The process as recited in claim 9 wherein the braze alloy rod is comprised of copper, silver and phosphorus.

11. The process as recited in claim 9 wherein the step of brazing is performed with gas tungsten arc welding equipment.

12. The process as recited in claim 11 wherein the step of brazing further comprises adjusting the gas tungsten arc welding equipment so that a brazing temperature in a range between 1300 and 1350 degrees fahrenheit is reached.

13. The process as recited in claim 9 further comprising the step of inserting a plug in each opening in the lead end of the plurality of hollow conductor strands so that braze material does not cover the openings.

14. The process as recited in claim 13 wherein the plug is tapered.

15. The process as recited in claim 13 wherein the step of inserting a plug further comprises the step of inserting a tapered expansion pin into and out of the opening in the lead end of the hollow conductor strand before the plug is inserted.

16. The process as recited in claim 13 wherein the plugs are comprised of a ceramic material.

17. The process as recited in claim 9 further comprising the step of clamping a water-cooled chill block to the stator coil.

18. The process as recited in claim 9 further comprising the step of de-burring each opening in the lead end of the plurality of hollow conductor strands after the braze material is applied.

19. The process as recited in claim 9 further comprising the step of pre-heating the inboard section and attached stator coil and using a torch to remelt the surface of the braze seal after the braze material has been applied to the lead ends.

20. The process as recited in claim 1 wherein step (d) comprises the steps of:
   (i) aligning the second outboard section such that the water passages are axially disposed;
   (ii) forcing the second outboard section against the inboard section; and,
   (iii) brazing the second outboard section to the inboard section.

* * * * *